(12) United States Patent
Ishikawa et al.

(10) Patent No.: US 7,841,439 B2
(45) Date of Patent: Nov. 30, 2010

(54) OCCUPANT WEIGHT DETECTING DEVICE

(75) Inventors: Tomomi Ishikawa, Iwata (JP);
Takayoshi Ozaki, Iwata (JP)

(73) Assignee: NTN Corporation, Osaka (JP)

( * ) Notice: Subject to any disclaimer, the term of this patent is extended or adjusted under 35 U.S.C. 154(b) by 145 days.

(21) Appl. No.: 12/230,027

(22) Filed: Aug. 21, 2008

(65) Prior Publication Data
US 2009/0051198 A1 Feb. 26, 2009

(30) Foreign Application Priority Data
Aug. 22, 2007 (JP) .............................. 2007-215894

(51) Int. Cl.
*G01G 19/12* (2006.01)
*B60R 21/015* (2006.01)
(52) U.S. Cl. ..................... 180/273; 73/862.46; 280/735
(58) Field of Classification Search ............ 73/862.381, 73/862.46, 862.471; 177/136, 144, 256–261; 180/273; 280/735; 297/217.2; 324/207.2, 324/207.11, 207.21, 207.25
See application file for complete search history.

(56) References Cited

U.S. PATENT DOCUMENTS

| | | | |
|---|---|---|---|
| 6,431,593 B1 * | 8/2002 | Cooper et al. ................ 280/735 |
| 6,442,504 B1 * | 8/2002 | Breed et al. .................. 702/173 |
| 6,566,869 B2 * | 5/2003 | Chamings et al. ....... 324/207.26 |
| 6,843,143 B2 * | 1/2005 | Steele et al. ............ 73/862.393 |
| 6,851,655 B2 * | 2/2005 | Kume et al. .................. 248/429 |
| 6,940,026 B2 * | 9/2005 | Rundell et al. ............... 177/144 |
| 7,082,846 B2 * | 8/2006 | Takata ................... 73/862.391 |
| 2002/0145422 A1 * | 10/2002 | Chamings et al. ....... 324/207.26 |
| 2005/0057065 A1 * | 3/2005 | Endoh et al. ............. 296/65.13 |
| 2006/0001306 A1 * | 1/2006 | Becker et al. .......... 297/344.15 |
| 2007/0012502 A1 * | 1/2007 | Molitor et al. ............... 180/273 |
| 2007/0158116 A1 * | 7/2007 | Peppler ......................... 177/1 |

FOREIGN PATENT DOCUMENTS

| | | |
|---|---|---|
| EP | 0990565 A1 | 4/2000 |
| JP | 11-001153 | 1/1999 |
| JP | 11-304575 | 11/1999 |

\* cited by examiner

*Primary Examiner*—Eric Culbreth
*Assistant Examiner*—Joseph Rocca

(57) ABSTRACT

A occupant weight detecting device detects the weight of an occupant setting on a vehicle seat assembly and includes a pivot support mechanism for supporting the vehicle seat assembly for pivotal movement about a horizontally extending shaft relative to a seat fixing portion in a vehicle; an elastic force applying mechanism for applying a biasing force to the vehicle seat assembly to enable the latter to pivot an angle, proportional to a load imposed on the vehicle seat assembly, relative to the seat fixing portion; a pivot angle detecting mechanism for detecting an angle of pivot of the vehicle seat assembly relative to the seat fixing portion; and a pivot restricting mechanism for defining a pivotal range over which the vehicle seat assembly can pivot relative to the seat fixing portion.

5 Claims, 5 Drawing Sheets

OCCUPANT WEIGHT DETECTING DEVICE

CROSS REFERENCE TO RELATED APPLICATIONS

This application is based on and claims priority to Japanese application No. 2007-215894 filed Aug. 22, 2007, which is incorporated by reference in its entirety into this application.

BACKGROUND OF THE INVENTION

1. Field of the Invention

The present invention relates to an occupant weight detecting device for detecting the weight of a seat occupant sitting on a vehicle seat.

2. Description of the Prior Art

In order to increase the occupant safety and amenity, it has been suggested to adjust settings of a seat assembly and various peripheral devices around the seat assembly in dependence on the weight of the seat occupant with an occupant weight detecting device. See the Japanese Laid-open Patent Publications No. 11-11535 and No. 11-304575. Such weight detecting device has a load sensor provided in a seat rail to directly detect a total weight of the seat and the occupant.

It has, however, been found that the prior art occupant weight detecting device of the type referred to above is of a design including a load sensor for weighing the weight of the seat occupant directly and, therefore, depending on the non-linear characteristic of the load sensor, difficulty is encountered in measuring the difference in weight of the particular seat occupant with high sensitivity and also with high accuracy over a wide range of variation of the seat occupant weight.

SUMMARY OF THE INVENTION

In view of the above, an object of the present invention is to provide an occupant weight detecting device of a type capable of measuring the weight of the seat occupant, sitting on an automobile seat assembly, with high sensitivity also with high accuracy over a wide range of variation of the seat occupant weight.

In order to accomplish the foregoing object, the present invention provides an occupant weight detecting device for detecting the weight of an occupant setting on a vehicle seat assembly includes a pivot support mechanism for supporting the vehicle seat assembly for pivotal movement about a horizontally extending shaft relative to a seat fixing portion in a vehicle; an elastic force applying mechanism for applying a biasing force to the vehicle seat assembly to enable the latter to pivot an angle, proportional to a load imposed on the vehicle seat assembly, relative to the seat fixing portion; a pivot angle detecting mechanism for detecting an angle of pivot of the vehicle seat assembly relative to the seat fixing portion; and a pivot restricting mechanism for defining a pivotal range over which the vehicle seat assembly can pivot.

According to the present invention, when the occupant gets seated on the seat assembly, the seat assembly pivots relative to the seat fixing portion an angle corresponding to the weight of the seat occupant by the action of the elastic force applying mechanism. The pivot angle detecting mechanism then detects the angle of pivot of the seat assembly. If the relation between the angle of pivot of the seat assembly and the load imposed on the seat assembly is determined beforehand, the load imposed on the seat assembly, that is, the weight of the seat occupant can be determined from the angle of pivot of the seat assembly.

In this way, since the use is made of the pivot support mechanism and the elastic force applying mechanism for supporting the seat assembly so that the latter can be pivoted an angle corresponding to the load imposed on the seat assembly, the relation between the load and the angle of pivot can be expressed by a linear or smoothly curved line over a wide range of variation of the seat occupant weight. With the occupant weight detecting device of the present invention, the angle of pivot, which varies in the manner described above, is measured to detect the occupant weight and, accordingly, the occupant weight can be detected with high sensitivity and also with high accuracy over the wide range of variation of the occupant weight.

In a preferred embodiment of the present invention, the pivot support mechanism includes a member on a side of the seat fixing portion, a member on a side of the vehicle seat assembly and a bearing assembly interposed therebetween so as to couple both of said members with each other. When the member on the side of the seat fixing portion and the member on the side of the seat assembly are connected with each other through the bearing assembly, the seat assembly can be supported for pivotal movement about the horizontally extending shaft relative to the seat fixing portion with a simplified structure.

In other preferred embodiment of the present invention the pivot angle detecting mechanism includes a magnetic sensor unit. For the magnetic sensor unit, a Hall sensor, an MR sensor (magneto resistive sensor) or the like can be employed.

The use of the magnetic sensor unit is effective to enable the occupant weight detecting device to be manufactured at a reduced cost as compared with the use of any other standard sensor. By way of example, the Japanese Laid-open Patent Publication No. 11-304575 discloses the use of a load sensor in the form of a strain gauge or a piezoelectric, electrostatic capacitive, magnetostrictive or pressure sensitive resistance sensor, and if such load sensor is employed, devices and detecting circuits would be needed and assemblage of those parts requires a complicated labor, resulting in an increase of the cost.

An output from the pivot angle detecting mechanism may be adapted to be supplied to at least one of the following five control units a)-e):

a) a control unit for controlling an extent, to which an air bag is deployed, b) a control unit for controlling a position of a steering wheel in one or both of vertical and forward or rearward directions, c) a control unit for controlling a position of the vehicle seat assembly in a forward or rearward direction, d) a control unit for controlling a position of a seat back of the vehicle seat assembly in a forward or rearward direction, and e) a control unit for controlling a position of a head rest of the vehicle seat assembly in a forward or rearward direction.

The output of the pivot angle detecting mechanism supplied to any one of the control units a)-e) makes it possible to render the safety factor of the seat occupant and the amenity or the like to be improved.

In accordance with another aspect of the present invention, a vehicle seat assembly is also provided, which includes a seat cushion of a generally rectangular shape having four corners and supported on a seat fixing portion of an automotive vehicle at the four corners through an occupant weight detecting device of the kind discussed above.

With the vehicle seat assembly of the present invention, the weight of the occupant sitting on the vehicle seat assembly can be detected by the occupant weight detecting device which supports four corners of a seat cushion of the vehicle seat assembly. The weight of the seat occupant can be determined from summation of detected values provided by the occupant weight detecting device. From the weight of the seat occupant so determined, the safety factor of the seat occupant and the amenity can be increased by changing various settings of the seat assembly and peripheral devices therefor.

Also, by comparing detected values of the occupant weight detecting devices with each other, distribution of the weight on the seat cushion can be obtained. A bodily build of the seat occupant and characteristics of the occupant way of sitting can be estimated from this weight distribution, and if correction of the various settings is effected based on the result of determination, reasonable settings to suit to the actual situation can be achieved.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF THE PREFERRED EMBODIMENTS

The present invention will hereinafter be described in detail in connection with a preferred embodiment thereof with reference to the accompanying drawings. In particular, FIGS. 1 and 2 illustrate a schematic side view and a schematic top plan view, respectively, of an automobile seat assembly provided with an occupant weight detecting device according to this embodiment of the present invention.

Figure 1:
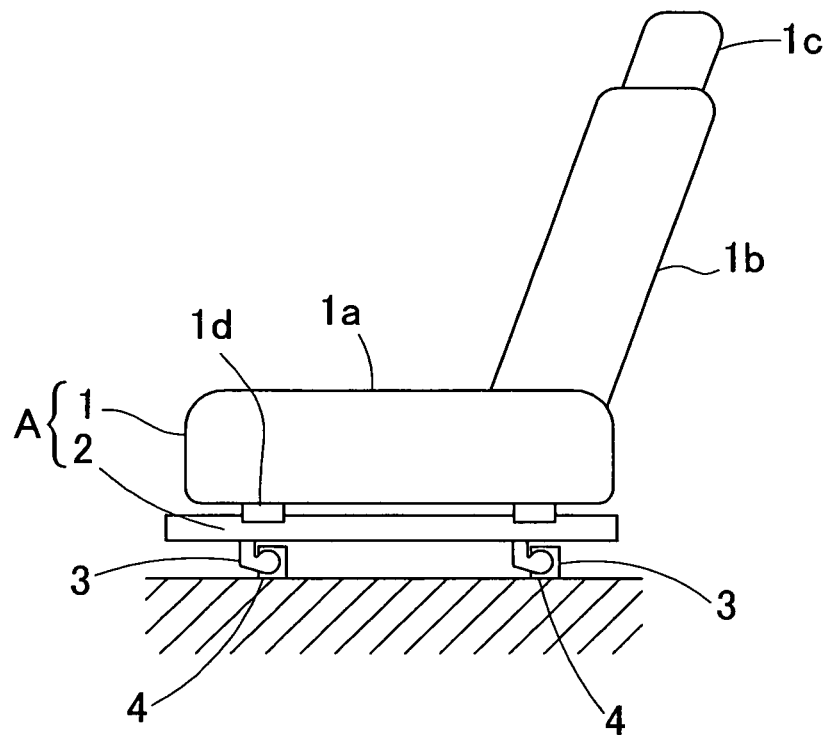
FIG. 1 is a schematic side view, showing an automobile seat assembly according to a preferred embodiment of the present invention.
Figure 2:
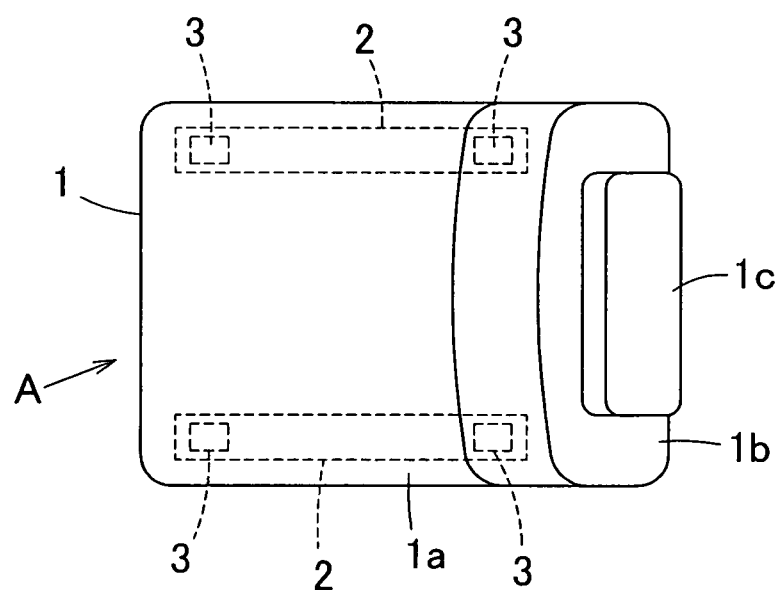
FIG. 2 is a schematic top plan view, showing the automobile seat assembly.

The automobile seat assembly A shown in FIGS. 1 and 2 includes a seat body 1 having a generally rectangular seat cushion 1a, a seat back 1b extending upwardly from the rear end of the seat cushion 1a at an angle relative to the seat cushion 1a, a head rest 1c mounted atop the seat back 1b and sliders 1d secured to an undersurface of the seat cushion 1a. The assembly A further includes a pair of parallel seat rails 2, one on each side of the seat assembly A extending in a direction parallel to the longitudinal sense of an automotive vehicle, so that the seat body 1 can be supported on the seat rail 2 via the sliders 1d so as to slidably move forward or rearward along the seat rails 2. The left and right seat rails 2 have their forward and rearward ends installed at respective seat fixing portions 4, each of which is a part of the vehicle floor, through four weight detector units 3, two employed for each of the seat rails 2. Thus, it will readily be seen that the seat assembly A is supported by the seat fixing portions 4 on the vehicle floor through the four weight detector units 3 arranged beneath four corners of the seat cushion 1a, with the two weight detector units 3 positioned on each side of the automobile seat assembly A.

Figure 3:
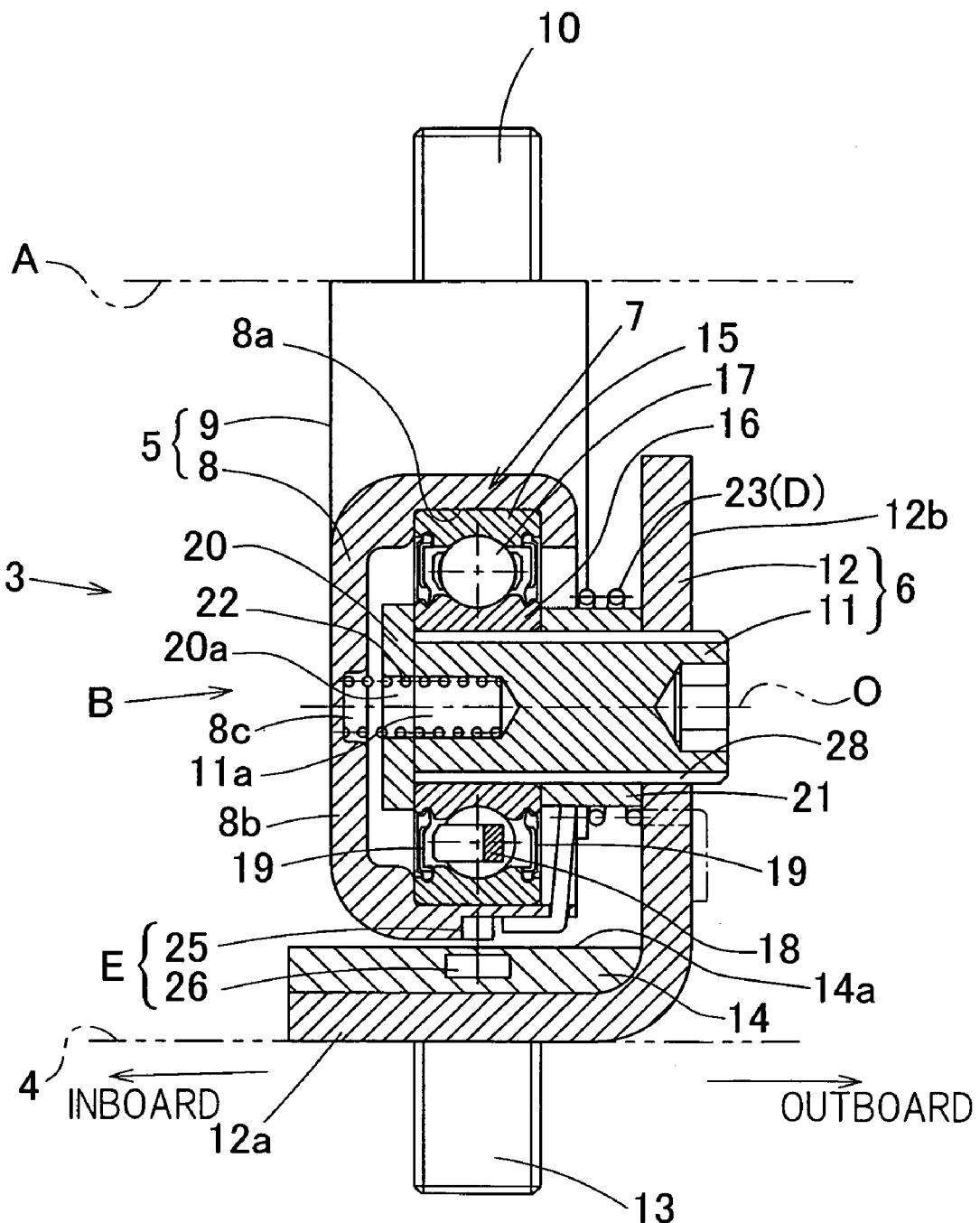
FIG. 3 is a fragmentary front sectional view, showing a occupant weight detecting device employed in association with the seat assembly.
Figure 4:
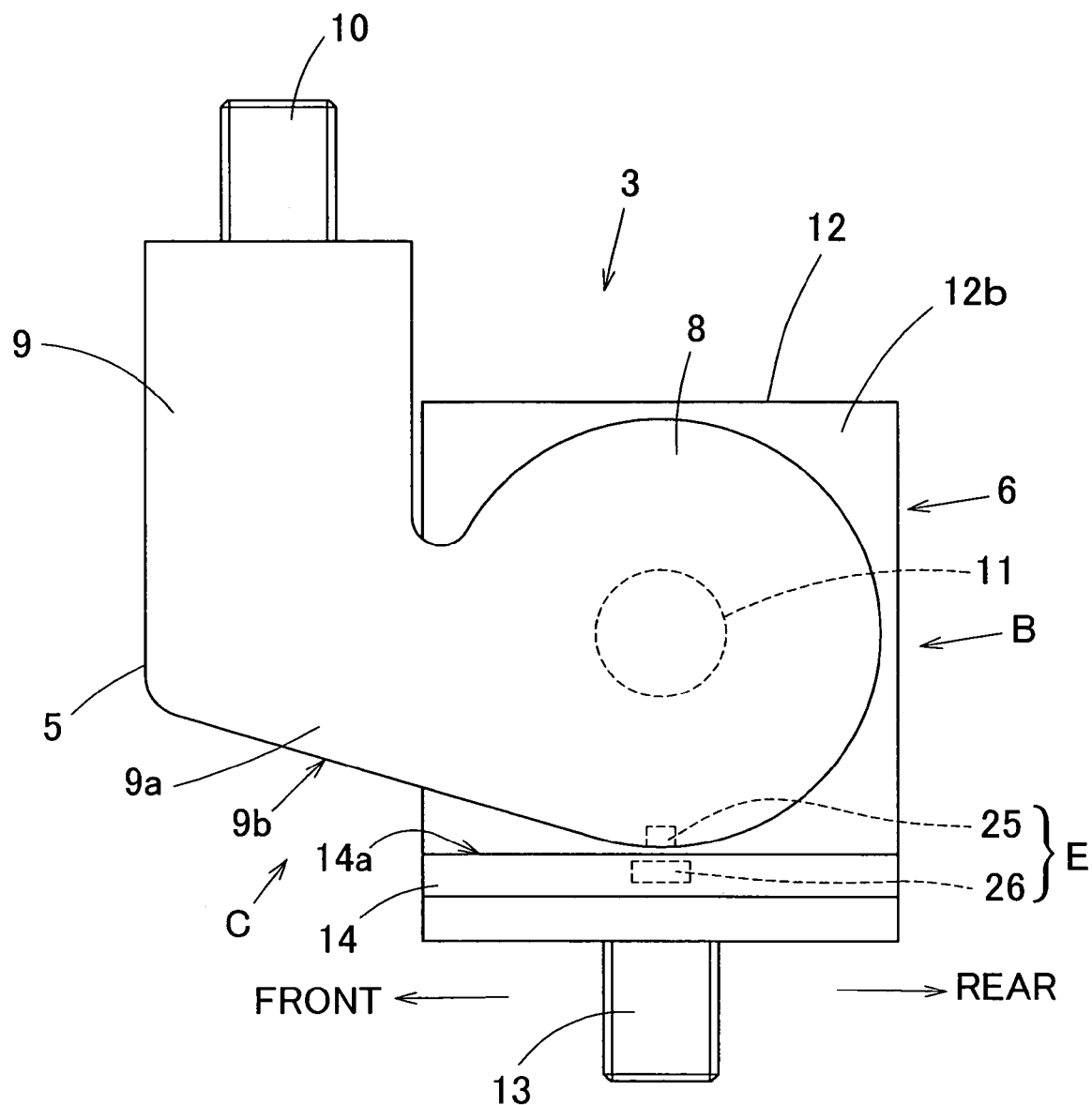
FIG. 4 is a schematic side view, showing the occupant weight detecting device in one operative position.
Figure 5:
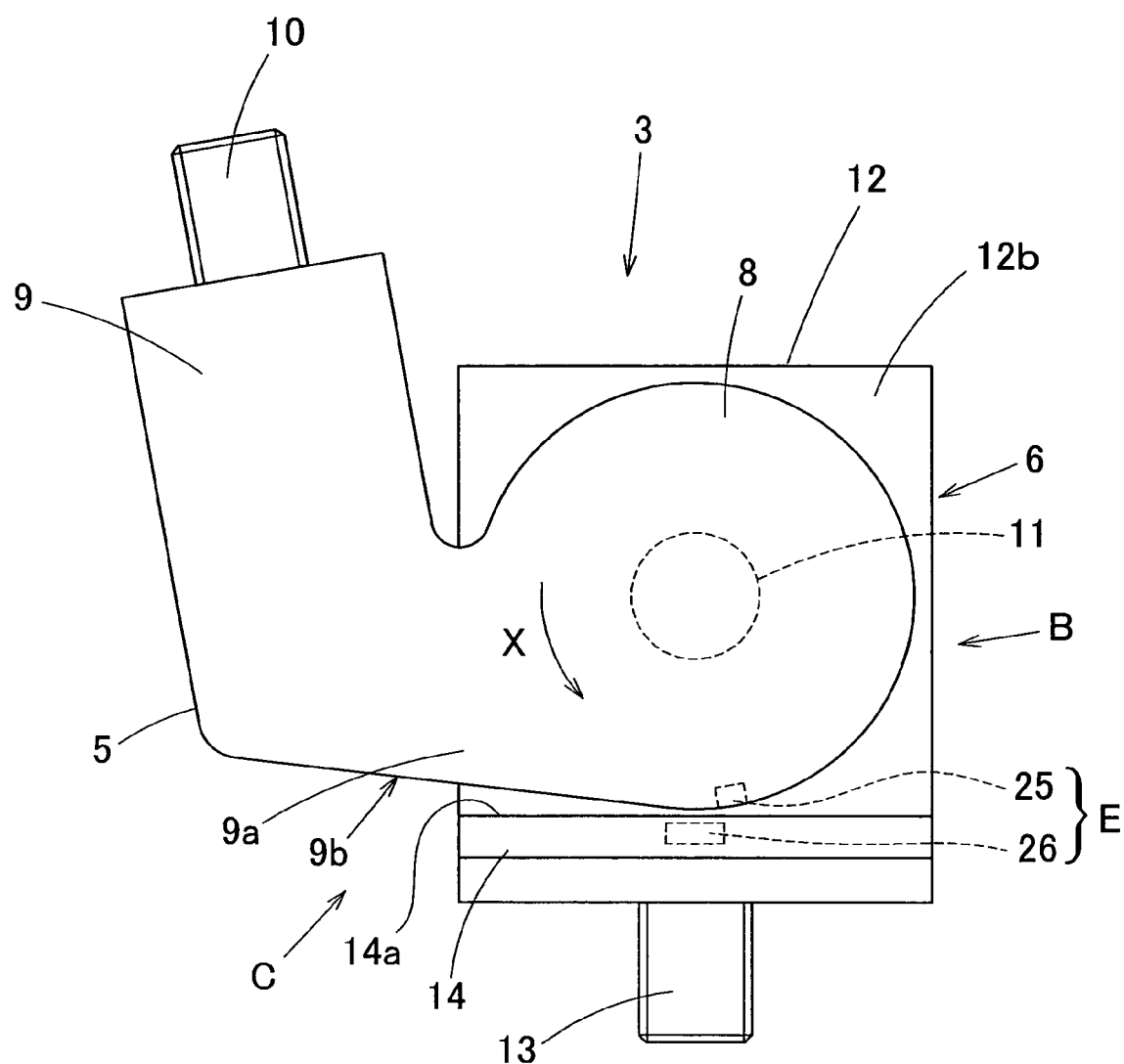
FIG. 5 is a schematic side view, showing the occupant weight detecting device in a different operative position.

Referring now to FIGS. 3 to 5, since the four weight detector units 3 are of the substantially same structure and, accordingly, in the following description of the details of thereof, reference will be made only one of them unless otherwise specified. The weight detector unit 3 includes a pivot support mechanism B for pivotally supporting the seat assembly A relative to the respective seat fixing portion 4 for rotation about a stud shaft 11 extending horizontally in a direction widthwise of the automotive body structure (not shown). This pivot support mechanism B includes a seat rail fixture 5, secured to the associated left or right seat rail 2, and a seat fixture 6 fixed to the seat fixing portion 4, which are operatively coupled together through a corresponding bearing assembly 7. The bearing assembly 7 includes an outer race 15, an inner race 16 positioned inside the outer race 15, a plurality of rolling elements 17, and a substantially ring-shaped retainer 18 for rollingly retaining the rolling elements 17 at predetermined intervals in a circular row.

The seat rail fixture 5 is made up of a generally cap-like cylindrical portion 8, having an end plate portion 8b closing the opening at one end of the cylindrical portion 8, and a generally vertically extending pillar 9 having a base portion 9a connected with an outer periphery of the cylindrical portion 8. While the cylindrical portion 8 has the outer race 15 of the bearing assembly 7 mounted on an inner periphery thereof as will be detailed later, the pillar 9 has a connecting screw 10 fitted to a free end portion thereof, or otherwise formed integrally therewith, so as to extend vertically upwardly, and the seat rail fixture 5 is secured to the associated seat rail 2 of the seat assembly A with the connecting screw 10 firmly engaged to such seat rail 2. As clearly shown in FIG. 4, in a normal condition in which the pillar 9 assumes a vertically oriented position, the base portion 9a of the pillar 9 has its lower surface 9b extending from the pillar 9 in a direction rearwardly with respect to the seat assembly so as to incline downwardly.

It is to be noted that the connecting screw 10 may be a member separate from the pillar 9.

In addition to the stud shaft 11 referred to previously on which the inner race 16 of the bearing assembly 7 is fixedly mounted at an inboard end thereof situated on one side of the vehicle body close to the longitudinal center thereof, the seat fixture 6 includes a generally L-shaped support bracket 12 having a horizontally extending base 12a and an upright wall 12b at right angles to the base 12a. This support bracket 12 is mounted on the stud shaft 11 with the opposite outboard end of the latter received fixedly by the upright wall of the support bracket 12. The seat fixture 6 of the structure described above is fixedly mounted on the vehicle floor with a mounting screw 13 extending downwardly from an undersurface of the base 12a of the support bracket 12 and firmly engaged at the corresponding seat fixing portion 4.

Detent mechanism 28 such as, for example, a splined engagement is provided between the stud shaft 11 and the inner race 16 of the bearing assembly 7 and, also, between the stud shaft 11 and the upright wall 12b of the support bracket 12 so that the stud shaft 11 will not rotate relative to the inner race 16 and only the outer race 15 of the bearing assembly 7 can rotate relative to the inner race 16 through the circumferential row of the rolling elements 17. The horizontally extending base 12a of the support bracket 12 has a sensor retaining plate 14 mounted thereon and having a horizontal upper surface 14a. It is to be noted that the mounting screw 13 may be a member separate from the support bracket 12.

Thus, when a load such as, for example, the weight of a seat occupant trying to get seated on the seat assembly A is imposed on the seat assembly A, the seat rail fixture 5 (together other three seat rail fixtures than the seat rail fixture now referred to) can be pivoted towards a maximum loaded position in a direction, shown by the arrow X in FIG. 5 about the longitudinal axis of the stud shaft 11 as viewed in FIG. 5, and the seat assembly A is consequently moved substantially forwardly with respect to the automotive body structure from a first or initial position towards a second or forward position. This pivotal movement of the seat rail fixture 5 is, when the latter is pivoted a predetermined angle about the stud shaft 11 in the manner described above, restricted by the undersurface 9b of the pillar base portion 9a then brought into engagement with the upper surface 14a of the sensor retaining plate 14, at which time the seat rail fixture 5 assumes the maximum loaded position. Accordingly, the base portion 9a of the pillar 9 and the sensor retaining plate 14 altogether constitute a pivot restricting mechanism C for preventing the seat rail fixture 5 from further pivoting about the stud shaft 11 beyond the predetermined angle.

It is to be noted that the mounting screw 13 referred to above may be a member separate from the support bracket 12.

Referring particularly to FIG. 3, the bearing assembly 7 employed in the illustrated embodiment is in the form of a deep groove ball bearing and, accordingly, the rolling elements 17 employed therein and intervening between the outer race 15 and the inner race 16 are in the form of balls. An annular bearing space delimited between the outer and inner races 15 and 16 of this bearing assembly 7 has its opposite open end surfaces closed by respective sealing members 19. With the outer race 15 nested within an annular seating groove 8a defined in an inner peripheral surface of the cylindrical portion 8 of the seat rail fixture 5, the outer race 15 and, hence, the bearing assembly 7 is axially immovably held in position. On the other hand, the inner race 16 of the bearing assembly 7 is axially immovably held in position by means of a collar 20, which may be rigidly secured to or otherwise integrally formed with the stud shaft 11, and a spacer sleeve 21 which is mounted around the stud shaft 11 and interposed between the inner race 16 and the support bracket 12.

A compression spring 22 is interposed between the seat rail fixture 5 and the stud shaft 11 to apply a proper preload to the bearing assembly 7. Specifically, the stud shaft 11 has an axially extending pocket 11a defined therein so as to extend in alignment the longitudinal axis thereof across a throughhole 20a in the collar 20. On the other hand, the end plate portion 8b of the cylindrical portion 8 of the seat rail fixture 5 has a round recess 8c defined therein in alignment with the pocket 20a, and the compression spring 22 made of a coil spring is so interposed with its opposite ends received within the round recess 8c and the pocket 11a across the through hole 20a.

Also, a coiled torsional spring 23 is mounted exteriorly around the spacer sleeve 21 with its opposite ends engaged with the cylindrical portion 8 of the seat rail fixture 5 and the upright wall 12b of the support bracket 12 of the seat fixture 6, respectively. This coiled torsional spring 23 is a primary component part of an elastic force applying mechanism D, which is operable to apply a resilient biasing force to the seat rail fixture 5 to urge the latter in a clockwise direction counter to the direction X shown in FIG. 5.

Thus, it will readily be seen that so long as no load is applied to the seat assembly A, the seat rail fixture 5 is held in the non-loaded position shown in FIG. 4, but when the load is applied to the seat assembly A, the seat rail fixture 5 can be pivoted towards the maximum loaded position relative to the seat fixing portion 4 a predetermined angle dependent on the magnitude of the applied load, with the seat assembly A moved from the initial non-loaded position towards the forward position shown in FIG. 5. Release of the applied load from the seat assembly A allows the seat rail fixture 5 to be urged by the elastic force applying mechanism D back to the non-loaded position with the seat assembly A consequently returning to the initial position.

The weight detector unit 3 shown in FIG. 3 also includes a pivot angle detecting mechanism E for detecting the angle of pivot of the seat rail fixture 5 and, hence, the seat assembly A relative to the associated seat fixing portion 4. This pivot angle detecting mechanism E includes a magnet 25, secured to a portion of the outer periphery of the cylindrical portion 8 of the seat rail fixture 5, and a magnetic sensor 26 retained by the sensor retaining member 14 on the seat fixture 6 so as to confront the magnet 25 at the non-loaded position. The magnetic sensor 26 referred to above may be a Hall sensor or an MR sensor (magnetoresistive sensor) and is of a type capable of outputting an analog signal indicative to the angle of pivot of the seat rail fixture 5.

Figure 6:
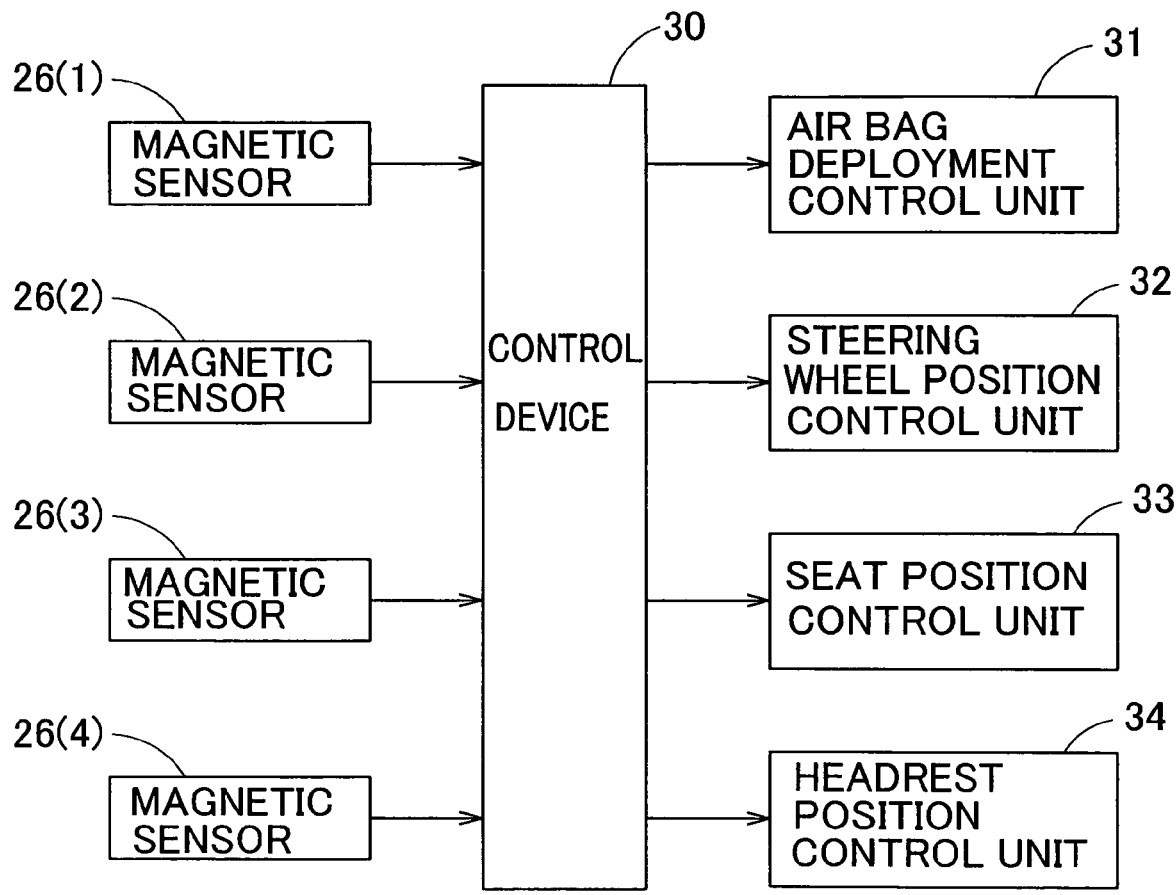
FIG. 6 is a circuit block diagram, showing a control system for the automobile seat assembly.

The operation of the occupant weight detecting device of the structure hereinabove described will now be described in connection with the details of a control system for the automobile seat assembly which is specifically shown in FIG. 6.

The magnetic sensors 26(1) to 26(4) of the respective weight detector units 3 secured to the corresponding four corners of the seat cushion 1a of the seat assembly A are electrically connected with an input side of a vehicle control device 30. This control device 30 may be, for example, a computer controlled ECU (Electric Control Unit) and has an output side electrically connected with an air bag deployment control unit 31, a steering wheel position control unit 32, a seat position control unit 33 and a head rest position control unit 34. Those various units 31 to 34 may be of a type forming respective parts of the control device 30. The functions of the control device 30 and those of the various units 31 to 34 will be described in detail later.

When the occupant gets seated on the seat cushion 1a of the seat assembly A with a load consequently imposed on the seat rail fixtures 5, the seat rail fixtures 5 are pivoted about the respective stud shafts 11 towards the maximum loaded position as shown in FIG. 5. Since the respective cylindrical portions 8 of the seat rail fixture 5 are operatively coupled with the stud shafts 11 through the corresponding bearing assemblies 7, the pivotal movement of the seat rail fixtures 5 takes place smoothly with the outer races 15 of the bearing assemblies 7 rotating relative to the inner races 16 thereof and, hence, the stud shafts 11 against the biasing forces exerted by the elastic force applying mechanisms D. In view of the biasing forces of the elastic force applying mechanisms D acting relatively against the pivotal movement of the seat rail fixtures 5, the seat rail fixture 5 are pivoted about the respective stud shafts 11a predetermined angle proportional to the weight of the seat occupant, which angle is in turn detected by the magnetic sensors 26. More specifically, the pivotal movement of each seat rail fixture 5 is not detected directly, but the movement of each magnetic sensor 26 in a horizontal direction (exactly speaking, the angular movement of each magnetic sensor 26 about the associated stud shaft 11) relative to the associated magnet 25 is detected by the corresponding magnetic sensor 26, which outputs an analog signal indicative of the angle of pivot of the respective seat rail fixture 5.

Since each of the magnets 25 and the associated magnetic sensor 26 is positioned spaced a distance radially outwardly from the center P of pivot of the associated seat rail fixture 5 (FIG. 3), the movement of each magnetic sensor 26 in the horizontal direction relative to the associated magnet 25 takes place over a substantial distance. For this reason, the angle of pivot can be detected with high sensitivity. The relation between the load acting on each seat rail fixture 5 and the angle of pivot of such seat rail fixture 5 can be adjusted by changing a spring constant of the corresponding coiled torsional spring 23.

The respective outputs from the magnetic sensors 26(1) to 26(4) are transmitted to the control device 30. The control device 30 includes a first relation setting unit (not shown), in which the relation between the load imposed on the seat assembly A, that is, the weight of the seat occupant, and the summation of the respective output values of the magnetic sensors 26(1) to 26(4) is set by means of, for example, a computing equation or a data table. By means of this relation setting unit, the weight of the seat occupant can be calculated based on the summation of the input values. Settings stored in the first relation setting unit are determined by means of a series of experiments and/or simulations.

Considering that the seat assembly A is supported above the vehicle floor for pivotal movement through an angle proportional to the magnitude of the load imposed on the seat assembly A, the relation between the load and the angle of pivot can be expressed by a linear or smoothly curved line over a wide range of variation of the seat occupant weight. With the occupant weight detecting device of the present invention, the angle of pivot, which varies in the manner described above, is measured to detect the occupant weight and, accordingly, the occupant weight can be detected with high sensitivity and also with high accuracy over the wide range of variation of the occupant weight.

The control device 30 also includes a second relation setting unit (also not shown) in which the relation between the respective output values of the magnetic sensors 26(1) to 26(4) and the occupant bodily build and characteristic of the occupant way of sitting is set. By means of the second relation setting unit the bodily build and characteristic of the seat occupant can be inferred based on the respective output values of the magnetic sensors 26(1) to 26(4). Stored contents of this second relation setting unit are also determined by means of a series of experiments and/or simulations.

Based on the information on the occupant weight, bodily build and characteristic of the way of sitting, which are obtained in the manner described above, output signals are supplied to the various control units 31 to 34. The air bag deployment control unit 31 controls the extent, to which an air bag (not shown) is to be deployed, based on the above described information on the occupant. The steering wheel position control unit 32 controls the position of a steering wheel (not shown) in one or both of vertical and forward or rearward directions. The seat position control unit 33 controls the position of the seat assembly A in the forward or rearward direction based on the above described information on the occupant. The head rest position control unit 34 controls, based on the above described information on the occupant, the position of the head rest 1c in the forward or rearward direction. When those controls are carried out, the safety factor of the seat occupant and the amenity or the like can be improved.

In the occupant weight detecting device of the structure hereinbefore described, the pivot support mechanism for supporting the seat assembly A for angular movement about the horizontally extending stud shafts 11 relative to the seat fixing portions 4 makes use of the bearing assembly 7 and, therefore, a simplified structure can be manufactured at a low cost. Also, since the pivotal motion of the seat assembly A is detected as a horizontal movement of the seat rail fixtures 5 relative to the seat fixtures 6 and the magnetic sensors 26 are employed for the detection of the pivotal motion of the seat assembly A, neither any device nor a detecting circuit for rotation detection is necessary any longer and no complicated labor is needed for installing them and, accordingly the weight detecting device can be constructed at a low cost.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. By way of example, although in the foregoing description, the elastic force applying mechanism D has been shown and described as including the coiled torsional springs 23 each operable to apply the biasing force to the associated seat rail fixture 5 which is a member on the part of the seat assembly A, it may be so designed as to apply the biasing force directly to the seat assembly A. Other than the springs, a damper or the like may be employed to apply the biasing force.

Also, although in the foregoing description of the preferred embodiment, the use has been shown and described of the various control units 31 to 34 for changing various settings of the vehicle seat assembly and its peripheral devices based on the result of detection achieved by the occupant weight detecting device, all of those control units 31 to 34 need not be employed and only one or some of them that suit to the specification of the automotive vehicle can be employed.

Accordingly, such changes and modifications are, unless they depart from the scope of the present invention as delivered from the claims annexed hereto, to be construed as included therein.

What is claimed is:

1. An occupant weight detecting device to detect the weight of an occupant sitting on a vehicle seat assembly, comprising:
    a pivot support mechanism to support the vehicle seat assembly for pivotal movement about a horizontally extending shaft relative to a seat fixing portion in a vehicle, the pivot support mechanism comprising a member on a side of the seat fixing portion, a member on a side of the vehicle seat assembly and a rolling bearing assembly interposed therebetween so as to couple both of said members with each other;
    an elastic force applying mechanism to apply a biasing force to the vehicle seat assembly to enable the latter to pivot at an angle, proportional to a load imposed on the vehicle seat assembly, relative to the seat fixing portion, the elastic force applying mechanism including a coiled torsional spring;
    a pivot angle detecting mechanism to detect an angle of pivot of the vehicle seat assembly relative to the seat fixing portion to determine the weight of the seat occupant therefrom; and
    a pivot restricting mechanism to define a pivotal range over which the vehicle seat assembly can pivot.

2. The occupant weight detecting device as claimed in claim 1, wherein the pivot angle detecting mechanism includes a magnetic sensor unit.

3. The occupant weight detecting device as claimed in claim 1, wherein an output from the pivot angle detecting mechanism is adapted to be supplied to a control unit to control an extent, to which an air bag is deployed, based on a result of detection achieved by the pivot angle detecting mechanism.

4. The vehicle seat assembly as claimed in claim 1, wherein the member on the side of the seat fixing portion has a stud shaft, on which the rolling bearing assembly and the coiled torsional spring are mounted.

5. A vehicle seat assembly comprising:
a seat cushion of a generally rectangular shape having four corners and supported on a seat fixing portion of an automotive vehicle at the four corners through four occupant weight detecting devices as defined in claim 1.

* * * * *